United States Patent [19]
Johnson et al

[11] 4,176,318
[45] Nov. 27, 1979

[54] RADIO TRANSMITTER DISPLAY INDICATOR

[75] Inventors: James A. Johnson, Buffalo Grove; Paul E. Kerfoot, Streamwood, both of Ill.

[73] Assignee: Motorola, Inc., Schaumburg, Ill.

[21] Appl. No.: 782,274

[22] Filed: Mar. 28, 1977

[51] Int. Cl.² ............... H04B 1/02; H04B 17/00
[52] U.S. Cl. ..................... 325/133; 325/25; 325/455; 340/715; 340/756
[58] Field of Search ............ 325/22, 25, 133, 176, 325/455; 332/38, 39; 340/660, 662, 715, 718, 719, 756, 760, 762

[56] References Cited
U.S. PATENT DOCUMENTS

| | | | |
|---|---|---|---|
| 3,580,421 | 5/1971 | Bickford | 340/336 |
| 3,719,849 | 3/1973 | Steward | 340/336 |
| 3,775,690 | 11/1973 | Ravenelle | 325/25 |
| 3,886,453 | 5/1975 | Quintiliani et al. | 325/25 |
| 3,983,484 | 9/1976 | Hodama | 325/25 |
| 4,010,456 | 3/1977 | Erni | 340/336 |
| 4,048,561 | 9/1977 | Wilcox et al. | 325/22 |
| 4,048,564 | 9/1977 | Gleeson, Jr. | 325/133 |

*Primary Examiner*—Richard Murray
*Assistant Examiner*—Jin F. Ng

*Attorney, Agent, or Firm*—James W. Gillman; Donald J. Lisa; Phillip H. Melamed

[57] ABSTRACT

Apparatus for visually indicating a particular operational condition of a radio transmitter, such as the transmitter being activated or the percentage amplitude modulation of the transmitted carrier. An electrical or electronic character display module having an integral decimal point display portion is utilized to visually indicate a transmitter circuit condition. Transmitter activation may be shown by coupling the push-to-talk circuit to the decimal point display. More specifically, the character display module is oriented to be viewed with the decimal point portion in a superscript position relative to the character.

A method for visually indicating the operational status of a radio transmitter includes the steps of providing a character display module having an integral decimal point, generating a signal indicative of a transmit circuit condition, and activating the decimal point display in response to the indicative signal. The indicative signal may be a transmitter activation signal obtained from a push-to-talk circuit or it may be a signal indicating percentage amplitude modulation of the transmit signal. The method also includes the step of orienting the character display module such that it may be viewed with the decimal point portion in a superscript position with respect to the character.

12 Claims, 4 Drawing Figures

RADIO TRANSMITTER DISPLAY INDICATOR

BACKGROUND OF THE INVENTION

1. Field of the Invention

This invention generally relates to apparatus and methods for indicating an operational condition of a radio transmitter. More particularly, this invention relates to apparatus and methods for visually indicating an operational condition of a radio transmitter utilizing character display modules having an integral decimal point display portion for visually indicating a transmit circuit condition.

2. Description of the Prior Art

The subject matter of the present invention finds application in mobile or portable transceivers, such as citizens band radios, in which inexpensive, simple apparatus and methods are required for indicating certain transmitter circuit conditions. Prior to this invention, several methods of visually indicating transmit on-off status were available. These include the use of discrete incandescent lamps or light emitting diodes, mounted to the front panel of the mobile or base transceiver and electrically connected to a circuit having an output indicative of the transmitter operational status. Such discrete components require mounting hardware therefor and also require additional assembly and testing time, both of which are expensive in mass-production produced products such as citizens bands tranceivers.

In many radio transceivers, particularly those using amplitude modulation, such as is used in a great number of citizens band radios, it is desirable that a means for visually displaying the percentage of amplitude modulation of the transmitted signal be included as an operational feature of the radio system. Many radios include a meter for monitoring various functions within the radio. Sometimes these radios also include a circuit for deriving a signal indicative of the percentage amplitude modulation of the transmit carrier and connect the indicative signal to the meter terminals. Oftentimes, an operator is not able to get a clear unobstructed view of the meter and some operators feel that the movement of a meter pointer along a meter scale does not provide a satisfactory display due to the damping and inertia of the meter movement.

Separate incandescent lamps or discrete light emitting diodes are used to visually indicate percentage of amplitude modulation of a transmitter signal; but, again, use of discrete components requires separate mounting hardware and assembly and testing, requiring extra handling and expense in a product designed to be competitively produced by mass-production assembly and testing techniques.

The use of an integral decimal point display which is part of a character display is known, for example, in the electronic frequency counter art. Causing the display to behave in a non-standard manner, such as blinking or displaying non-standard characteristics, is sometimes used to indicate that the electronic frequency counter has exceeded some predetermined operating condition, for example that the counter is in an overflow state. Generally, the conditions indicated are of a malfunctioning system or of a system exceeding its limits with no thought of the decimal point display being used to perform a visual indication of a circuit function of a properly operating system.

Consequently, the need for inexpensive, simply assembled and tested visual indicators providing an operational status display for certain radio transmitter functional conditions has been ever increasing due to the increased interest in personal communications such as provided by citizens band radio.

SUMMARY OF THE INVENTION

Accordingly, an object of this invention is to provide an improved apparatus and method for visually indicating an operational condition of a radio transmitter.

Another object of this invention is to provide a visual indication of an operational condition of a radio transmitter including a character display module having an integral decimal point display portion for displaying said condition.

Another object of this invention is to provide an improved apparatus and method for visually displaying a transmit circuit condition which is simply installed and easily operated.

Another object of this invention is to provide an inexpensive method of visually indicating transmitter on-off status and percentage of amplitude modulation of a transmitted signal.

Briefly, the invention comprises improved apparatus for visually indicating an operational condition of a radio transmitter including a radio communication equipment having a transmit circuit which produces a transmit signal. Transmit circuit condition means are coupled to the radio communication equipment and derive a signal indicative of a particular transmit circuit condition. A character display module for said radio communication equipment is provided having an integral decimal point display portion to which is coupled the indicative signal for visually indicating the particular transmit circuit condition. Particular circuit conditions indicated are transmit on-off status and percentage of amplitude modulation of the transmit signal. The character display module having the integral decimal point display portion may be oriented to be viewed with the decimal point portion in a superscript position relative to the character. The invention contemplates a plurality of character display modules, at least one of which has a decimal point display portion oriented in a superscript position relative to the characters.

A method for visually indicating an operational condition of a radio transmitter includes the steps of providing a radio communication equipment having a transmit circuit with a transmit signal output and having a character display module with an integral decimal point display portion. Also included are the generation of a signal indicative of a particular transmit circuit condition and the activation of the decimal point display portion in response to the indicative signal. Further steps are included for deriving a signal indicative of the modulated transmit signal, including an amplitude modulated signal, and coupling said signal to the decimal display portion. Orientation of a display module or a plurality of display modules is provided so as to have at least one decimal point display portion to be viewed with the decimal point display portion in a superscript position relative to the character, or characters, displayed.

BRIEF DESCRIPTION OF THE DRAWINGS

For a more complete understanding of the invention, reference is made to the drawings in which.

DESCRIPTION OF THE PREFERRED EMBODIMENT

Figure 1:
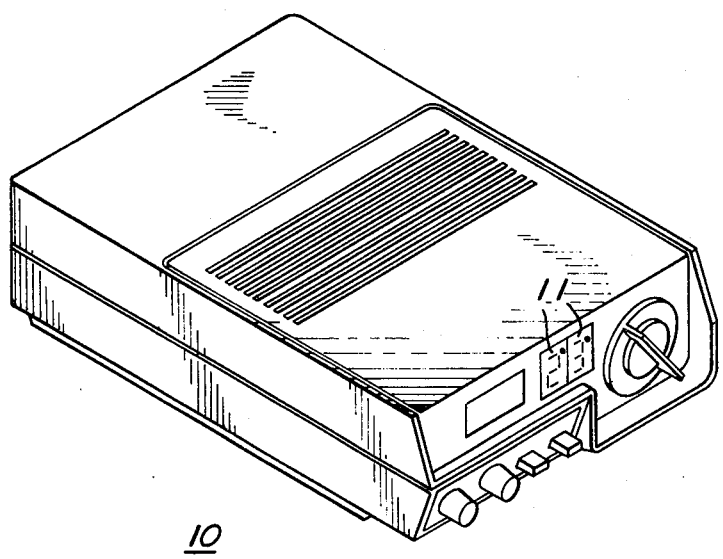
FIG. 1 is a perspective view of a radio communication equipment having character display modules according to the invention.
Figure 2:
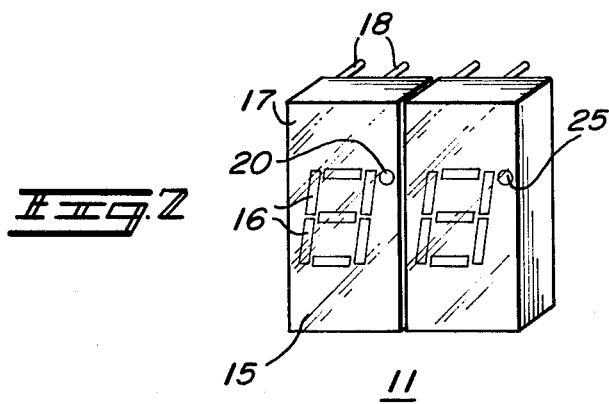
FIG. 2 is an enlarged perspective view of two character display modules having integral decimal point display portions arranged to be viewed in a superscript position relative to the characters.

The particular embodiment disclosed hereinafter relates to a radio communication equipment commonly known as a citizens band radio; but the invention is not limited thereto and finds a variety of applications in other radio communication equipment as will be apparent. Referring to FIG. 1 of the drawings, a radio communication equipment 10 is shown having two light emitting diodes character display modules 11. FIG. 2 shows on an enlarged scale the two display modules 11. Such modules are used to indicate, for example, the channel number to which a citizens band radio is tuned, as is well-known in the art. Display of other numeric characters indicating certain predetermined system performance parameters is also possible using the display modules 11.

FIG. 2 shows two seven-segment character display modules with integral decimal points which typically may be used in the invention. The MAN 3620 seven-segment display, produced by the Monsanto Company Electronics Division, is a typical character display module. The luminous intensity emitted by such a device is directly proportional to the forward current through the light emitting diode segments. The segments 16 of which there are seven form the digits zero through nine and are imbedded in a front surface 17 of the module 15 which is formed of an impact resistant plastic material, and has pins 18 (typically shown) arranged in a fourteen pin dual in-line package configuration standard in the industry for mounting on a printed circuit board. The segments 16 form numeric characters which are three tenths of an inch high and which have viewing angles of 150°. The segments 16 display the channel to which the radio equipment 10 is tuned while decimal point portions are simultaneously used to indicate other operative conditions.

Also mounted on the front surface 17 of the module 15 is a decimal point portion 20, which is an integral part of the display module 15. Typically, a module is oriented so that when the character is viewed the decimal point is mounted postioned in a subscript position with respect to the character. By a subscript position is meant a position with respect to the character immediately below, below and to the right or left, or to the right or left of the lower half of the character. Conversely, by a superscript position is meant a position with respect to the character immediately above, or above and to the right or left, or to the right or left and next to the upper half of a character.

According to the present invention the decimal point 20 may be mounted in a superscript position with respect to the character as is the decimal point 20 shown in FIG. 2. The decimal point 20 is mounted in a superscript position to avoid confusion by the transceiver operator. The superscript position of the decimal point 20 is preferred, but the invention comtemplates positioning the decimal point 20 in any location provided that the decimal point is an integral part of the display module 15.

Figure 4:
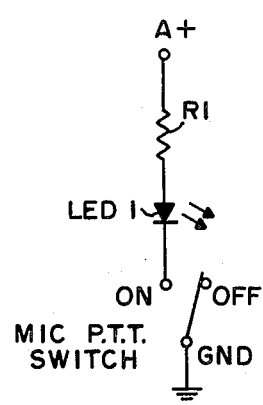
FIG. 4 is a schematic diagram of a circuit which activates the transmitter on-off visual display according to the invention.

Using a device such as the MAN 3620 in an inverted character position, requires that the electrical connections to the segment 16 be electrically activated in such a manner as to provide a properly oriented character when viewed by an observer. Such circuit wiring arrangements may be easily implemented by one knowledgable in the art. The radio communication equipment 10 contains a transmit circuit which is activated by a push-to-talk switch (PTT SWITCH) which is part of a microphone assembly (not shown) as is well-known in the art. FIG. 4 shows a switch labeled MIC PTT SWITCH which designates the microphone push-to-talk switch, which connects a ground potential terminal GND to the terminal labelled ON when activated. When the ON terminal is connected to a ground potential, current flows from the positive polarity battery voltage terminal labeled A+ through resistor R1 and light emitting diode LED 1 when a voltage source (not shown) to connected terminal A+. Current through light emitting diode LED 1 causes light to be emitted, thereby providing a visual indication that the transmit circuit is in the on state. The circuit shown in FIG. 4 is thus activated by the push-to-talk switch circuitry and activates the light emitting diode LED 1 which corresponds to the decimal point portion 20 of the module 15 as shown in FIG. 2.

The radio communication equipment 10 may have a transmit signal which is amplitude modulated by an information signal such as, for example, an audio signal obtained from a microphone (not shown). Typically, such amplitude modulated transmitters modulate a carrier signal by adding the modulation signal voltage to the transmitter power amplifier supply voltage, as is well-known in the art.

Figure 3:
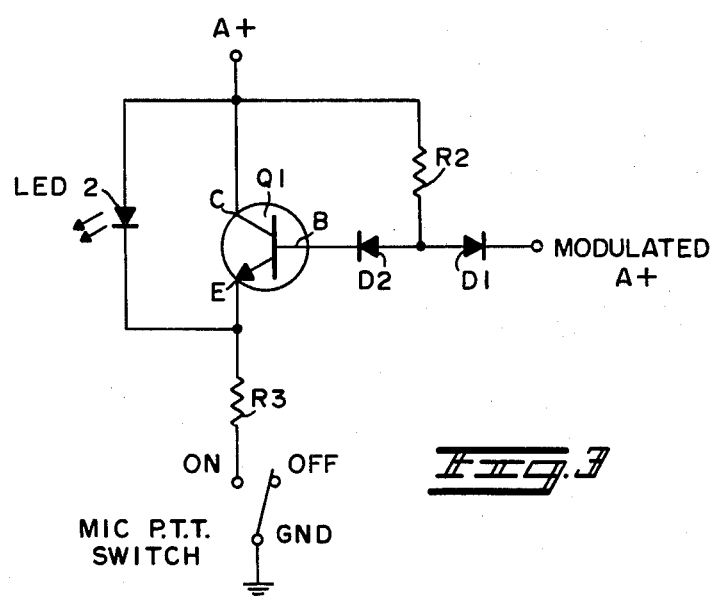
FIG. 3 is a circuit diagram of a circuit for deriving a signal indicative of the percentage of amplitude modulation of a transmit carrier and for visually displaying that circuit condition.

FIG. 3 shows a circuit which causes light emitting diode LED 2, which corresponds to a second decimal point display portion 25 as shown in FIG. 2, to change brightness in accordance with the percentage of amplitude modulation of a transmitted signal. The positive polarity battery voltage terminal A+ is connected to a direct current voltage source of 13.8 volts (not shown). A terminal labeled MODULATED A+ has connected to it a signal comprising the sum of the direct current voltage at terminal A+ and the transmitter modulating audio signal. The signal at the terminal MODULATED A+ has a voltage level ranging from two to zero times the voltage at terminal A+, corresponding respectively to maximum upward an downward amplitude modulation of the transmitter carrier signal, as is well-known in the art. The current shown in FIG. 3 is activated by positioning the microphone push-to-talk switch MIC PTT SWITCH to provide a connection between the ON terminal and the circuit ground terminal GND.

When no transmitter modulation audio signal is present, the MODULATED A+ terminal is at the same potential as the A+ terminal and diode D1 is not conducting. When the transmitted signal is being upwardly modulated, diode D1 is reverse biased. As long as diode D1 is not conducting or reverse biased, current flows from terminal A+ through resistor R2 and diode D2 to provide base current to the base terminal B of a control transistor Q1, thereby causing control transistor Q1 to be in the on, or saturated, state with a few hundred millivolt voltage difference between the emitter terminal E and the collector terminal C of said transistor Q1. Terminal E, therefore, is at a voltage potential very nearly that at terminal A+. Since light emitting diode LED 2 requires about 2 volts to be activated, no light is emitted, indicating zero percentage of modulation of the carrier.

As the carrier signal is downwardly modulated, current is drawn through diode D1 and away from the base terminal B of control transistor Q1 so that control transistor Q1 begins to go out of the saturated mode and starts turning off thereby allowing light emitting diode LED 2 to vary in brightness in conformity with the percentage of downward modulation.

A plurality of modules may form a display having at least one of the modules with the decimal point oriented in superscript position with respect to the character display portion of the modules.

Other types of displays as are known in the art, such as gas discharge and plasma displays, having integral decimal point display portions may also be utilized according to this invention.

A method for visually indicating an operational condition of a radio transmitter such as that contained within a radio communication equipment 10 as shown in FIG. 1 includes provides a character display module 11 having an integral decimal point display portion 20 as shown in FIG. 2. A signal indicative of a predetermined transmit circuit condition is generated and the decimal point 20 is activated in accordance therewith. The radio communication equipment 10 is provided with a push-to-talk circuit comprising a mircophone push-to-talk switch button such as shown in FIG. 3 and FIG. 4 in a schematic form. The microphone circuit (not shown) provides an information signal, such as a voice signal, for modulating the transmit signal of the radio communication equipment 10. A signal indicative of the modulated transit signal is derived and coupled to the decimal point display portion 20. The signal derived indicative of the modulated transmit signal is a signal proportional to the percentage of amplitude modulation when the transmit signal is an amplitude modulated signal. The circuit shown in FIG. 3 derives a signal indicating the percentage of amplitude modulation of the transmit signal and varies the light intensity of light emitting diode LED 2 in accordance therewith as described hereinabove.

The circuit shown in FIG. 4 utilizes a push-to-talk switch to activate the circuit comprising resistor R1 and light emitting diode LED 1 to give a visual indication of transit operation.

This invention also provides a method of visually indicating an operational condition of a radio transmitter which includes the step of orienting character display module 15 with the decimal points display portion 20 in a superscript position relative to the character. A plurality of such modules may be provided as long as at least one of said modules is oriented to be viewed with at least one of the decimal point portions 20 in a superscript position relative to the characters and the decimal point display portion 20 is activated in response to one of the signals indicative of transmit mode operation of the transmitter or indicative of the percent of amplitude modulation of the transmit signal.

It should be understood that the principles of the present invention apply to display modules other than light emitting diodes, such as gas discharge or plasma displays and to operational conditions of a radio transmitter other than on-off condition or percentage of amplitude modulation.

While particular embodiments and methods of the invention have been shown and described, it should be understood that the invention is not limited thereto since many modifications may be made. It is therefore contemplated to cover by the present application any and all such modifications that fall within the true spirit and scope of the basic underlying principles disclosed and claimed herein.

We claim:

1. Apparatus for visually indicating an operational condition of a radio transmitter comprising:
   radio communication equipment having a transmit circuit for emitting a transmit signal;
   at least one character display module coupled to said radio communication equipment, said module having an integral character display portion for visually indicating one operative condition of said radio communication equipment and an integral decimal point display portion;
   transmit circuit condition means coupled to said radio communication equipment for deriving a signal indicative of a transmit circuit condition different from said one condition; and
   means for coupling said indicative signal to said decimal point display portion to visually indicate said transmit circuit condition by said decimal display portion while said character display portion simultaneously visually indicates said one condition.

2. The apparatus of claim 1 wherein the radio communication equipment includes a push-to-talk circuit for activating said transmit circuit to a transmit condition.

3. The apparatus of claim 1 wherein the transmit signal is modulated by an information signal and wherein the transmit circuit condition means includes a circuit for deriving a signal indicative of the modulated signal condition and said indicative signal is coupled to said integral decimal point display portion for controlling the excitation thereof.

4. The apparatus of claim 3 wherein the transmit signal is amplitude modulated by said information signal and wherein the indicative circuit derives a signal proportional to the percent modulation of said transmit signal.

5. The apparatus of claim 4 wherein said indicative signal comprises a modulated DC signal which results in said decimal point display portion visually indicating during a portion of said modulated DC signal.

6. The apparatus of claim 5 wherein said modulated DC signal controls the conductive state of a transistor which controls the excitation of said decimal point display portion.

7. The apparatus of claim 1 wherein said character display module is oriented to be viewed with said integral decimal point portion in a superscript position relative to the character display portion.

8. The apparatus of claim 1 wherein said character display module is oriented to be viewed with said integral decimal point portion in a superscript position relative to the character display portion and said transmit circuit condition means comprising at least one of circuit means for deriving a signal indicative of a transmit mode operation and circuit means for deriving a signal indicative of the percent of modulation of the transmit signal having an output coupling its output signal to the decimal point display portion of said one character display module.

9. The apparatus of claim 8 which includes at least two of said character display modules, each having an integral decimal point display portion oriented in a superscript position, wherein one of said decimal point display portions receives a signal indicative of the percentage of modulation and the other decimal point display portion receives a signal indicative of the transmit mode.

10. The apparatus of claim 9 which includes a push-to-talk switch which controls the excitation of both of said decimal point display portions.

11. The apparatus of claim 10 wherein said character display portions indicate the operative channel frequency of said radio communication equipment.

12. The apparatus of claim 11 wherein said modulation indicative signal indicates the percent of amplitude modulation of the transmit signal.

* * * * *